W. M. BROOKS.
BOX STRAP SEAL.
APPLICATION FILED MAY 9, 1918.
1,285,607.
Patented Nov. 26, 1918.
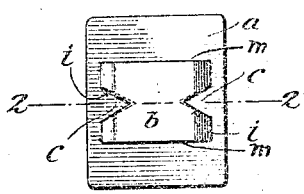
Fig. 1.
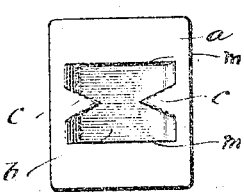
Fig. 2.
Fig. 3.
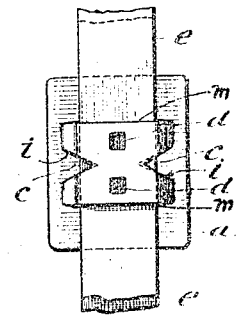
Fig. 4.
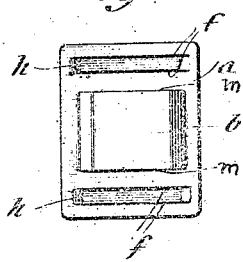
Fig. 5.
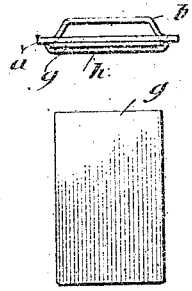
Fig. 6.
Fig. 7.
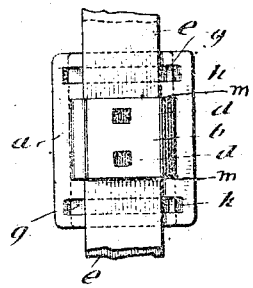
Fig. 8.
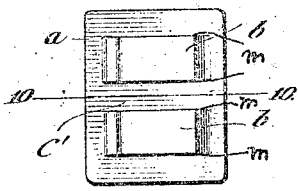
Fig. 9.
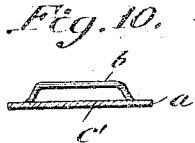
Fig. 10.
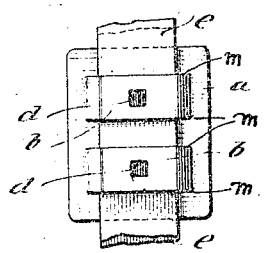
Fig. 11.
Inventor:
Winfred Mudge Brooks
By
Atty.

UNITED STATES PATENT OFFICE.

WINFRED MUDGE BROOKS, OF EAST ORANGE, NEW JERSEY, ASSIGNOR TO E. J. BROOKS & CO., OF NEW YORK, N. Y., A CORPORATION OF NEW YORK.

BOX-STRAP SEAL.

1,285,607.　　　　　Specification of Letters Patent.　　Patented Nov. 26, 1918.

Application filed May 9, 1918.　Serial No. 233,536.

*To all whom it may concern:*

Be it known, that I, WINFRED MUDGE BROOKS, a citizen of the United States of America, and a resident of East Orange, in the State of New Jersey, have invented certain new and useful Improvements in Box-Strap Seals, of which the following is a specification.

The object of this invention is to render more secure and permanent the sealing and fastening means in connection with auxiliary metal seal parts adapted to be used in connection with metal box straps.

The invention consists in certain novel structural features in a sheet metal auxiliary seal part for box straps as hereinafter more particularly described.

One sheet of drawings accompanies this specification as part thereof, in which like reference characters denote like parts throughout.

Referring to the drawings, Figure 1 is a top view of the preferred type of seal; Fig. 2 is an end sectional view taken on the line 2—2 of Fig. 1; Fig. 3 is a bottom view of this seal and Fig. 4 shows this type of seal after sealing on the box straps. Figs. 5 and 6 show top and end views respectively of a second type of this seal, Fig. 7 is a face view of an auxiliary base part used with this second type of seal and Fig. 8 shows a top view of this seal after sealing on the box strap. Fig. 9 is a top view of a third type of this seal, Fig. 10 is a sectional end view taken on the line 10—10 of Fig. 9 and Fig. 11 is a top view of this seal after sealing on the box strap.

The seal embracing this invention is preferably constructed of substantially rigid non-resilient sheet metal and has a body part $a$ in which are cut two parallel slits $m$, the portion between the slits $m$ designated as $b$ being raised to form the top of a passageway between said two slots adapted to receive the lapped ends of a box strap $e$. The sealing is done by punching downwardly through this top part $b$ and the overlapped box strap ends beneath the depressed burs formed from the seal part and the box strap ends interlocking and forming a secure fastening. Practice has demonstrated however that it is essential to keep the box straps in close contact with the top of the auxiliary seal part both during and after this punching operation in order to produce an effective locking seal and to this end an auxiliary support is provided consisting preferably of two approximately V shaped prongs or spurs $c$ formed by intersecting slots on each side of the top part $b$, which spurs are retained in the plane of the base part $a$ and form an auxiliary bottom adjacent to the points of punching. In the type of seal shown in Figs. 5, 6 and 8 additional slits $f$ are provided on each end and the portions $h$ embraced between said slits are repressed forming passageways adapted to receive snugly the ends of an auxiliary bottom shown in Fig. 7. In the type of seal shown in Figs. 9, 10 and 11 the top part $b$ is divided into two parts separated by a narrow strip which is retained in the plane of the base part $a$ forming a bottom support for the box strap ends adjacent to the points of punching.

In operation the box strap $e$ is passed around the box or package to be sealed and its ends threaded from opposite sides through the passageway of the auxiliary seal part under its top $b$ and over the auxiliary supports or spurs $c$ which are designed to press the strap ends snugly against the top $b$. The strap is then tightened by any suitable means and sealed by punching through said top part $b$ preferably at two points as indicated by $d$.

Modifications in shape and form to suit particular purposes will readily suggest themselves to those skilled in the art.

Having thus fully described my invention, I claim:

1. An improved box strap seal of sheet metal having a body portion, provided with parallel slits, a passage between said slits having a top part and adapted to receive lapped box strap ends and means integral with said body portion for supporting said box strap ends within said passage in close contact with the top of said passage.

2. An improved box strap seal of sheet metal having a body part a passageway adapted to receive lapped ends of a box strap, a top to said passageway adapted to be punched into interlocking engagement with said inclosed box strap ends and lips integral with said body part and in the same plane therewith adjacent to the point of punching adapted to hold said box strap ends in close engagement with said top during and after the sealing operation.

3. An improved box strap seal of sheet metal having a body, a passageway adapted to receive the lapped ends of a box strap, a top to said passageway and spurs projecting inwardly from each side of said passageway adapted to hold said lapped ends of the box strap in close engagement with said top substantially as specified.

4. An improved box strap seal constructed in one part of substantially thick sheet metal, having a flat body portion, two parallel slits therethrough, the metal between said slits being raised to form the top of a passageway except for two V shaped spurs one on each side formed by converging slits and held in the plane of the base to form a support adapted to hold box strap ends threaded through said passage in close contact with the top.

WINFRED MUDGE BROOKS.

Witnesses:
   GEO. O. TOTTEN,
   G. H. MAYNARD.